United States Patent
Muis

(10) Patent No.: US 9,276,295 B2
(45) Date of Patent: Mar. 1, 2016

(54) STORAGE BATTERY ARRANGEMENT

(75) Inventor: Pascal Muis, Pontoise (FR)

(73) Assignee: Johnson Controls—SAFT Advanced Power Solutions LLC, Wilmington, DE (US)

( * ) Notice: Subject to any disclaimer, the term of this patent is extended or adjusted under 35 U.S.C. 154(b) by 1205 days.

(21) Appl. No.: 12/696,975

(22) Filed: Jan. 29, 2010

(65) Prior Publication Data

US 2010/0183904 A1     Jul. 22, 2010

Related U.S. Application Data

(63) Continuation-in-part of application No. PCT/IB2008/001984, filed on Jul. 30, 2008.

(30) Foreign Application Priority Data

Jul. 30, 2007    (DE) .......................... 10 2007 035 946

(51) Int. Cl.
  *H01M 2/00*     (2006.01)
  *H01M 10/42*    (2006.01)
  *H01M 2/02*     (2006.01)
  *H01M 10/48*    (2006.01)

(52) U.S. Cl.
  CPC ............ *H01M 10/425* (2013.01); *H01M 2/023* (2013.01); *H01M 10/48* (2013.01)

(58) Field of Classification Search
  CPC ...................................................... H01M 2/023
  USPC ........................................................... 429/61
  See application file for complete search history.

(56) References Cited

U.S. PATENT DOCUMENTS

| 2,042,806 A | 6/1936 | Schulte |
| 2,416,079 A | 2/1947 | Anthony |
| 3,338,452 A | 8/1967 | Oakley et al. |

(Continued)

FOREIGN PATENT DOCUMENTS

| CN | 1499677 | 5/2004 |
| EP | 0 607 675 B1 | 9/1996 |

(Continued)

OTHER PUBLICATIONS

Office Action for European Application No. 07836697.8, mail date Mar. 7, 2011, 11 pages.

(Continued)

*Primary Examiner* — Tony G Soohoo
*Assistant Examiner* — Peter Keyworth
(74) *Attorney, Agent, or Firm* — Foley & Lardner LLP

(57) ABSTRACT

A storage battery arrangement includes a plurality of battery cells each having a cell housing having at least one cell terminal protruding from an end of the cell housing. The storage battery arrangement also includes a plurality of control units each having a control unit housing and electronic circuitry provided inside the control unit housing for monitoring and controlling at least one of the plurality of battery cells. The control units each include at least one control terminal extending to the outside of the control unit housing, the control terminal being electrically connected to the electronic circuitry. The size and shape of each of the control unit housings are substantially similar to the size and shape of the cell housings so that the control units can be arranged side-by-side among the battery cells and electrically connected the same way to the battery cells.

25 Claims, 1 Drawing Sheet

(56) References Cited

U.S. PATENT DOCUMENTS

| | | | |
|---|---|---|---|
| 4,189,473 | A | 2/1980 | Cole et al. |
| 4,554,221 | A | 11/1985 | Schmid |
| 4,957,829 | A | 9/1990 | Holl |
| 5,336,570 | A | 8/1994 | Dodge, Jr. |
| 5,606,238 | A | 2/1997 | Spellman et al. |
| 5,866,276 | A | 2/1999 | Ogami et al. |
| 5,879,833 | A | 3/1999 | Yoshii et al. |
| 6,001,501 | A | 12/1999 | Collie |
| 6,106,972 | A | 8/2000 | Kokubo et al. |
| 6,174,618 | B1 | 1/2001 | Nishiyama et al. |
| 6,265,091 | B1 | 7/2001 | Pierson et al. |
| 6,379,831 | B1 | 4/2002 | Draper et al. |
| 6,379,837 | B1 | 4/2002 | Takahashi et al. |
| 6,410,184 | B1 | 6/2002 | Horiuchi et al. |
| 6,410,185 | B1 | 6/2002 | Takahashi et al. |
| 6,465,123 | B1 | 10/2002 | Baumann et al. |
| 6,472,098 | B1 | 10/2002 | Sawada et al. |
| 6,541,154 | B2 | 4/2003 | Oogami et al. |
| 6,558,835 | B1 | 5/2003 | Kurisu et al. |
| 6,656,632 | B2 | 12/2003 | Asaka et al. |
| 6,858,345 | B2 | 2/2005 | Amine et al. |
| 6,896,995 | B2 | 5/2005 | Saito |
| 6,923,837 | B2 | 8/2005 | Longhi et al. |
| 6,932,651 | B2 | 8/2005 | Mita et al. |
| 6,953,638 | B2 | 10/2005 | Inui et al. |
| 6,979,502 | B1 | 12/2005 | Gartstein et al. |
| 7,014,949 | B2 | 3/2006 | Kanai et al. |
| 7,094,496 | B2 | 8/2006 | Rodriguez et al. |
| 7,129,001 | B2 | 10/2006 | Munenaga et al. |
| 7,147,963 | B2 | 12/2006 | Kimoto et al. |
| 7,160,643 | B2 | 1/2007 | Kunimoto et al. |
| 7,189,474 | B2 | 3/2007 | Hamada et al. |
| 7,270,576 | B2 | 9/2007 | Kim et al. |
| 7,351,493 | B2 | 4/2008 | Uemoto et al. |
| 2001/0046624 | A1 | 11/2001 | Goto et al. |
| 2003/0059676 | A1 | 3/2003 | Ruiz Rodriguez et al. |
| 2004/0038123 | A1 | 2/2004 | Hisamitsu et al. |
| 2004/0175612 | A1 | 9/2004 | Conti |
| 2005/0048365 | A1 | 3/2005 | Miyahisa et al. |
| 2005/0079408 | A1 | 4/2005 | Hirano |
| 2005/0100783 | A1 | 5/2005 | Ro et al. |
| 2005/0170239 | A1 | 8/2005 | Uemoto et al. |
| 2005/0170240 | A1 | 8/2005 | German et al. |
| 2005/0174092 | A1 | 8/2005 | Dougherty et al. |
| 2005/0287427 | A1 | 12/2005 | Kim et al. |
| 2006/0026822 | A1 | 2/2006 | Seman et al. |
| 2006/0040173 | A1 | 2/2006 | Shimamura et al. |
| 2006/0063067 | A1 | 3/2006 | Kim |
| 2006/0073378 | A1 | 4/2006 | Hamery et al. |
| 2006/0073379 | A1 | 4/2006 | Kim et al. |
| 2006/0078789 | A1 | 4/2006 | Wegner |
| 2006/0162149 | A1 | 7/2006 | Ha et al. |
| 2006/0177734 | A1 | 8/2006 | Yao |
| 2006/0204840 | A1 | 9/2006 | Jeon et al. |
| 2006/0216582 | A1 | 9/2006 | Lee et al. |
| 2006/0216583 | A1 | 9/2006 | Lee et al. |
| 2006/0234119 | A1 | 10/2006 | Kruger et al. |
| 2006/0246350 | A1 | 11/2006 | Takayama et al. |
| 2007/0015050 | A1 | 1/2007 | Jung et al. |
| 2007/0026303 | A1 | 2/2007 | Jeon et al. |
| 2007/0026305 | A1 | 2/2007 | Jeon et al. |
| 2007/0026306 | A1 | 2/2007 | Lee et al. |
| 2007/0026739 | A1 | 2/2007 | Kim et al. |
| 2007/0037051 | A1 | 2/2007 | Kim et al. |
| 2008/0160395 | A1 | 7/2008 | Okada et al. |
| 2009/0111015 | A1 | 4/2009 | Wood et al. |
| 2010/0183904 | A1 | 7/2010 | Muis |

FOREIGN PATENT DOCUMENTS

| | | | |
|---|---|---|---|
| EP | 1 109 237 | A1 | 6/2001 |
| EP | 1 213 784 | A2 | 6/2002 |
| EP | 1 503 442 | A2 | 2/2005 |
| EP | 1 250 720 | B1 | 5/2006 |
| EP | 1 786 051 | A1 | 5/2007 |
| FR | 2058740 | A5 | 5/1971 |
| FR | 2585185 | A1 | 1/1987 |
| GB | 2 136 629 | A | 9/1984 |
| JP | 2003-308823 | | 10/2003 |
| JP | 2007-012487 | | 1/2007 |
| JP | 2007-280831 | | 10/2007 |
| WO | WO 2007/134198 | A1 | 11/2007 |
| WO | WO 2008/021230 | A2 | 2/2008 |
| WO | WO 2008/027343 | A1 | 3/2008 |
| WO | WO 2008/074034 | A1 | 6/2008 |
| WO | WO 2008/086417 | A2 | 7/2008 |
| WO | WO 2008/098193 | A2 | 8/2008 |
| WO | WO 2010/019764 | A2 | 2/2010 |
| WO | WO 2010/085636 | A2 | 7/2010 |

OTHER PUBLICATIONS

Office Action for U.S. Appl. No. 12/263,123, dated Jun. 6, 2012, 10 pages.
International Preliminary Report on Patentability for International Application No. PCT/IB2008/001984, dated Feb. 2, 2010, 6 pages.
International Search Report for International Application No. PCT/IB2008/001984, dated Feb. 4, 2009, 2 pages.
Communication under Rule 71(3) EPC for European Application No. 07783619.5, dated Jan. 31, 2011, 61 pages.
European Search Report for European Application No. 09012377.9, dated Dec. 22, 2009, 10 pages.
International Preliminary Report on Patentability, Written Opinion of the International Searching Authority and International Search Report for International Application No. PCT/US2007/017785, dated Mar. 3, 2008, 15 pages.
International Search Report and Written Opinion for International Application No. PCT/US2009/053697, dated Mar. 23, 2010, 6 pages.
International Search Report for International Application No. PCT/US2007/068716, dated Oct. 17, 2007, 5 pages.
International Search Report for International Application No. PCT/US2010/021791, dated Aug. 13, 2010, 3 pages.
Notice of deficiencies of European Application No. 07836697.8, dated Aug. 31, 2009, 2 pages.
Office Action for Chinese Application No. 200780025271.0 with English translation, dated Sep. 8, 2010, 4 pages.
Office Action for European Application No. 07783619.5, dated Jul. 29, 2009, 4 pages.
Office Action for European Application No. 07836697.8, dated Feb. 17, 2010, 3 pages.
Office Action for European Application No. 09012377.9, dated Jun. 1, 2010, 1 page.
Office Action for European Application No. 09012377.9, dated Oct. 7, 2010, 3 pages.
Office Action of Chinese Patent Application No. 200780029735.5 with English translation, dated Jun. 25, 2010, 10 pages.
Response to Office Action for European Application No. 07783619.5, dated Feb. 5, 2010, 9 pages.
Response to Office Action for European Application No. 07836697.8, dated Jan. 6, 2010, 6 pages.
Response to Office Action for European Application No. 07836697.8, dated Jun. 25, 2010, 9 pages.
Response to Office Action for European Application No. 09012377.9, dated Feb. 10, 2011, 5 pages.
Response to Office Action for European Application No. 09012377.9, dated Sep. 28, 2010, 14 pages.
Written Opinion of International Application No. PCT/US2007/068716, dated Oct. 17, 2007, 6 pages.

STORAGE BATTERY ARRANGEMENT

CROSS-REFERENCE TO RELATED PATENT APPLICATIONS

This application is a Continuation-in-Part of International Patent Application PCT/IB2008/001984, filed Jul. 30, 2008, which claims the benefit of and priority to German Patent Application No. 10 2007 035 946.4, filed Jul. 30, 2007. International Patent Application PCT/IB2008/001984 and German Patent Application No. 10 2007 035 946.4 are incorporated herein by reference in their entireties.

BACKGROUND

The present invention relates to a storage battery arrangement comprising a plurality of battery cells having a cell housing and cell terminals protruding from the cell housing, and a plurality of control units each comprising a control unit housing and electronic circuitry provided for monitoring and controlling the battery cell status inside the control unit housing.

Storage battery arrangements are widely used for power supply of electronic devices and are of main importance for hybrid vehicles. Hybrid vehicles require high sophisticated cell arrangements in view of cooling the storage battery and control of the cells. Therefore, control units are provided for a set of cells comprising at least one of temperature sensor, voltage sensor and current sensor for monitoring the status of a set of cells.

For example, DE 43 37 020 C1 discloses a method for monitoring a battery of hybrid vehicle by use of a temperature sensor for a plurality of cells, a voltage and current measurement unit for measuring the voltage of the plurality of cells and the current flowing through the set of cells connected in series. Based upon the measured temperature, voltage and current data, the state of charge is calculated. In order to monitor and control the status of each cell, WO 99/52167 discloses a control unit integrated in cylindrical cell housing. The built-in controller controls the discharge and charge cycles of the respective cell. There is no communication between the cell control unit and a central control unit provided for a plurality of cells.

Integrating a control unit in the cell housing requires complicated cell assembly. Further, the electronic circuitry of the control unit is exhibited to high temperature in the inside of the cell and must be protected from the cell chemistry.

Further, it is known to locate the current sensor and electronic circuitry of the control unit at significant distance away from the battery cell terminals which requires specific wiring and connection time.

SUMMARY

According to an exemplary embodiment, a storage battery arrangement includes a plurality of battery cells each having a cell housing having at least one cell terminal protruding from an end of the cell housing. The storage battery arrangement also includes a plurality of control units each having a control unit housing and electronic circuitry provided inside the control unit housing for monitoring and controlling at least one of the plurality of battery cells. The control units each include at least one control terminal extending to the outside of the control unit housing, the control terminal being electrically connected to the electronic circuitry. The size and shape of each of the control unit housings are substantially similar to the size and shape of the cell housings so that the control units can be arranged side-by-side among the battery cells and electrically connected the same way to the battery cells.

According to another exemplary embodiment, a storage battery arrangement includes a plurality of cells each having a housing and at least one terminal extending from an end of the housing. The storage battery arrangement also includes a plurality of control units each having a housing and electronic circuitry provided therein for monitoring and controlling at least one of the plurality of cells. Each of the control units includes at least one terminal extending from an end of the housing and electrically connected to the electronic circuitry inside the housing of the control unit. The plurality of cells and the plurality of control units are arranged side-by-side in an alternating fashion such that a control unit is provided in between a first one of the plurality of cells and a second one of the plurality of cells.

According to another exemplary embodiment, a method of providing a storage battery includes providing a plurality of cells, each of the cells having a housing and at least one terminal extending from an end of the housing. The method also includes providing a plurality of control units, each of the control units having a housing and electronic circuitry provided therein. Each of the control units include at least one terminal extending from an end of the housing and electrically connected to the electronic circuitry. The method further includes arranging the plurality of cells and the plurality of control units side-by-side in an alternating fashion such that a control unit is provided in between a first one of the plurality of cells and a second one of the plurality of cells.

DETAILED DESCRIPTION

Figure 1:
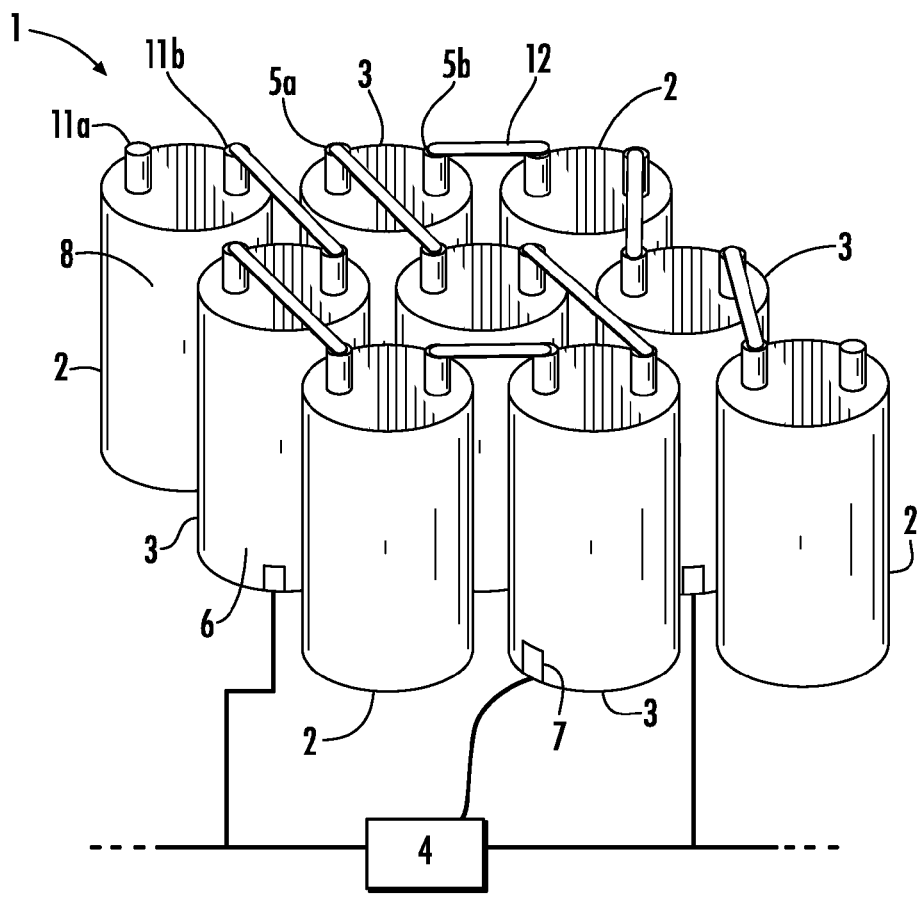
FIG. 1 is a schematic perspective view of a storage battery arrangement comprising battery cells and control units according to an exemplary embodiment.

According to an exemplary embodiment, a storage battery arrangement is improved so that a cell control unit can be easily installed in a storage battery arrangement so that the control units can be handled as separate parts and connected to a central control unit.

The storage battery arrangement comprises a plurality of battery cells having a cell housing and cell terminals protruding from the cell housing and a plurality of control units each comprising a control unit housing and electronic circuitry provided inside the control unit housing for monitoring and controlling the battery cell status, wherein the control units comprise control terminals extending to the outside of the control unit housing, said control terminals being electrically connected to the electronic circuitry, and wherein the shape of the control unit housings are adapted to the shape of the cell housings so that the control units can be arranged side by side to the battery cells according to the battery cells and electrically connected the same way as the battery cells.

According an exemplary embodiment, the control unit is designed similar to the battery cells, so that the control units can be placed like battery cells adjacent to the battery cells the respective control unit is provided for controlling.

A battery cell and a dedicated control unit can be connected by use of copper bars mounted to a cell terminal and a corresponding control terminal. The advantage of the similar design of battery cell and control unit is that the control units can be packed and connected to the battery cells as simple as if it were an additional cell. The control units have a compact design allowing an easy installation into the battery pack and an easy electrical connection without risk of confusion between input and output of the current sensor of the control unit. The positive and negative control terminals are simply used according to the positive and negative cell terminals wherein the positive and negative cell and control terminals may differ from each other in length, diameter, position and/or shape.

In a preferred embodiment, the cell housing and the control unit housing have a cylindrical shape. Preferably, the diameter of the cell housing and the control unit housing is (almost) the same.

In a further preferred embodiment of the storage battery arrangement, a positive cell terminal and negative cell terminal are protruding from a cell housing at a top side of the cell housing. Accordingly, a positive control terminal and a negative control terminal are protruding from a control unit at a top side of a control unit housing. Said positive and negative control terminals are arranged in a distance to each other similar to the distance of the positive and negative control terminals so that dedicated cell terminals and control terminals can be connected to each other via bus bars, or, in another embodiment, the control unit can be placed on top of the dedicated battery cell with the control terminals extending in the direction of the cell terminals so that a control terminal can be electrically and mechanically connected to a dedicated cell terminal.

When battery cells and control units are placed side-by-side to each other current connector bars can be connected to cell terminals and control unit terminals such that cell terminals of dedicated battery cells are electrically connected to each other with the control units being connected in between.

Further, it is preferred when a plug connector is arranged in the control unit housing, said plug connector comprising terminals connected to the electronic circuitry and provided to plug wire connection of the control units to a central battery control unit. By way of the plug connectors of the control units, control communication between the plurality of control units and central battery control units becomes possible. Preferably, the plug connector and the electronic circuitry are provided for a field bus communication, e.g. by use of a serial bus.

Further, it is preferred when a shunt is provided between a positive and a negative control terminal of a control unit for measuring the current flow between the positive and negative control terminal. Said shunt forms a current connector bar and the respective control unit is provided for connecting the positive control terminal to a terminal of the battery cell other than a battery cell the negative control terminal is connected to. Thus, a control unit is serially connected between two battery cells so that current flowing through the cells can be measured by use of the shunt provided inside the control unit housing between the positive control terminal and the negative control terminal.

Referring to FIG. 1, a storage battery assembly 1 is shown in a schematic perspective view, said storage battery assembly 1 comprising a plurality of cylindrical battery cells 2 and dedicated cylindrical control units 3. Further, a central control unit 4 is provided for controlling a set of battery cells 2 of the storage battery assembly 1. The control unit 3 comprises electronic circuitry for monitoring and controlling the state of at least one dedicated battery cell 2. Each control unit 3 comprises a shunt for measuring the voltage flowing though a positive control terminal 5*a* and a negative control terminal 5*b*. Further, temperatures sensors, current sensors and/or voltage sensors (not shown) can be integrated in the control unit 3.

The control terminals 5*a*, 5*b* are protruding from the top side of the control unit housing 6. Further, a plug connector 7 is provided in the control unit housing 6 preferably at the bottom side of the control unit housing 6. The plug connector 7 comprises terminals 9 connected to the electronic circuitry 10 inside the cell housing 8, wherein plug connector 7 and electronic circuitry are provided to communicate with the central control unit 4 in order to transmit status information about the status of the dedicated battery cell 2 to the central control unit 4 and/or to receive control signals or control data for controlling the charge/discharge cycle of the dedicated battery cells 2 the control unit 3 is assigned to.

The control unit housing 6 has the same cylindrical shape as the shape of the battery cells 2. Further, the positive and negative cell terminals 11*a*, 11*b* are extending from the top side of the battery cell housing 8 similar to the control terminals 5*a*, 5*b* extending from the control unit housing 6.

Battery cell terminals 11*a*, 11*b* and corresponding control terminals 5*a*, 5*b* are electrically connected to each other by use of current connector bars 12 extending between corresponding cell terminals 11*a*, 11*b* and control terminals 5*a*, 5*b* in a manner known per se, where the cell terminals 11*a*, 11*b* have internal threads.

By use of the current connector bars 12, battery cells 2 can be electrically connected in series with a control unit 3 serially connected in between. Optionally, battery cells 2 and control units 3 can be connected in parallel depending on the sensor integrated into the control unit housing 6. A current sensor in the form of a shunt requires serially connecting a control unit 3 wherein a voltage sensor requires parallel connection.

Figure 2:
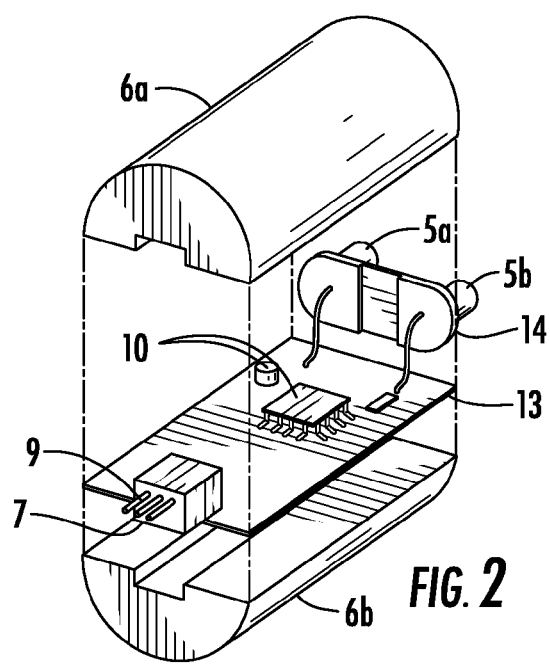
FIG. 2 is an exploded view of a control unit in a cylindrical housing according to an exemplary embodiment.

Referring to FIG. 2, an exploded view of a control unit 3 having a cylindrical shape of the control unit housing 6 is shown. The control unit housing 6 is divided into an upper part 6*a* and an lower part 6*b*. A printed circuit board 13 is provided inside the control unit housing 6 carrying electronic circuitry 10 for monitoring the status of at least one battery cell 2, the control unit 3 is assigned to and/or for controlling the charge/discharge cycle of the dedicated battery cell 2. The electronic circuitry 10 and methods for monitoring and controlling a battery status are well known in the art so that further explanation is not required.

A shunt 14 is electrically connected to the electronic circuitry 10 and to a positive control terminal 5*a* and negative control terminal 5*b* so, that current flowing between the positive and negative control terminal 5*a*, 5*b* can be measured by the electronic circuitry. Further, it is of advantage to integrate a temperature sensor into the control unit housing 6 connected to the electronic circuitry 10 for controlling the battery cell status by use of the measured temperature. For example, a temperature sensor can be mounted on the metal part of the shunt 14 close to the positive and negative terminal 5*a*, 5*b*. Due to the high thermal conductivity of the metal parts of the shunt 14 and the terminals 5*a*, 5*b*, a temperature sensor placed on those metal parts able to measure a temperature, which corresponds to the temperature of the battery cell 2 connected to the control terminal 5.

Further, a plug connector 7 is arranged at the bottom of the cell housing 8 comprising terminals 9 being connected to the electronic circuitry 10. The plug connector 7 and the electronic circuitry 10 are provided for communicating with the central control unit 4 as well as with other control units 5. For example the plug connector 7 and the electronic circuitry 10 can be provided for bus communication so that a control unit 3 is able to communicate with any other control unit 3 or a central control unit 4.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A storage battery arrangement comprising:
   a plurality of battery cells each comprising a cell housing having at least one cell terminal protruding from an end of the cell housing; and
   a plurality of control units each comprising a control unit housing and electronic circuitry provided inside the control unit housing for monitoring and controlling at least one of the plurality of battery cells;
   wherein the control units each comprise at least one control terminal extending to the outside of the control unit housing, the control terminal being electrically connected to the electronic circuitry;
   wherein each of the control unit housings is substantially similar in size, shape, and volume to each of the cell housings so that the control units can be arranged side-by-side among the battery cells and electrically connected the same way to the battery cells; and
   wherein a positive cell terminal and a negative cell terminal protrude from the end of each of the cell housings and wherein a positive control terminal and a negative control terminal protrude from an end of each of the control unit housings, the positive and negative control terminals being arranged a distance apart from one another similar to the distance apart from one another of the positive and negative cell terminals.

2. The storage battery arrangement of claim 1, wherein each cell housing and each control unit housing have a cylindrical shape with substantially similar diameters and axial dimensions.

3. The storage battery arrangement of claim 1, further comprising current connector bars connected to the cell terminals and control unit terminals such that the cell terminals of dedicated battery cells are electrically connected to each other with the control units being connected in between.

4. The storage battery arrangement of claim 1, further comprising a plug connector arranged on the control unit housing, the plug connector comprising terminals connected to the electronic circuitry inside the control unit housing and configured to electrically connect the control unit to a central battery control unit.

5. The storage battery arrangement of claim 1, further comprising a shunt provided between a positive control terminal and a negative control terminal of the control unit for measuring the current flow between the positive and negative control terminals.

6. The storage battery arrangement of claim 1, wherein the positive terminal of one of the control units is electrically connected to the negative terminal of a first adjacent cell and the negative terminal of the control unit is electrically connected to the positive terminal of a second adjacent cell.

7. The storage battery arrangement of claim 1, further comprising a shunt provided between the positive and negative terminals of the control unit for measuring the current flow between the positive and negative control terminals.

8. The storage battery arrangement of claim 1, wherein the positive and negative terminals of the control units are configured substantially similar to the configuration of the positive and negative terminals of the cells.

9. The storage battery arrangement of claim 1, wherein a spacing of the positive and negative terminals of the control units is similar to a spacing of the positive and negative terminals of the cells.

10. The storage battery of claim 2, wherein an axis of the control unit housing of each control unit is spaced apart from an axis of the cell housing of the at least one battery cell monitored and controlled by the control unit.

11. The storage battery of claim 10, wherein the axes of the control unit housings and the axes of the cell housings are generally parallel.

12. The storage battery of claim 5, wherein current flows through the shunt between the positive control terminal and the negative control terminal.

13. The storage battery of claim 1, wherein each battery cell is surrounded by a gap, and the gap surrounding each battery cell is continuous with the gap surrounding each other battery cell to form a continuous void.

14. A storage battery arrangement comprising:
a plurality of cells each comprising a housing and at least one terminal extending from an end thereof; and
a plurality of control units each comprising a housing and electronic circuitry provided therein for monitoring and controlling at least one of the plurality of cells, the housing of each control unit being a separate structure from the housing of each other control unit and from the housing of each cell, such that each control unit may be installed in the battery arrangement independent of each other control unit and each cell;
wherein each of the control units comprise at least one terminal extending from an end of the housing and electrically connected to the electronic circuitry inside the housing of the control unit;
wherein the plurality of cells and the plurality of control units are arranged side-by-side in an alternating fashion such that a control unit is provided in between a first one of the plurality of cells and a second one of the plurality of cells; and
wherein each of the plurality of cells comprises a positive terminal and a negative terminal extending from an upper end thereof, and wherein each of the plurality of control units comprises a positive terminal and a negative terminal extending from an upper end thereof.

15. The storage battery arrangement of claim 14, wherein the housing of each of the control units is substantially similar in size, shape, and volume to the housing of each of the cells.

16. The storage battery arrangement of claim 14, wherein the housing of each of the control units and the housing of each of the cells have a cylindrical shape.

17. The storage battery arrangement of claim 14, wherein current connector bars connect the terminal of one of the cells to the terminal of one of the control units.

18. The storage battery arrangement of claim 14, wherein each of the plurality of control units further comprises a plug connector arranged on the housing of the control unit, the plug connector comprising terminals electrically connected to the electronic circuitry inside the housing of the control unit and configured to electrically connect the control unit to a central battery control unit.

19. The storage battery of claim 14, wherein each control unit is spaced apart from the at least one battery cell it monitors and controls.

20. The storage battery of claim 19, wherein a common plane passes through a central portion of each housing of the control units and through a central portion of each housing of the cells.

21. The storage battery of claim 14, wherein each battery cell is surrounded by a gap, and the gap surrounding each battery cell is continuous with the gap surrounding each other battery cell to form a continuous void.

22. A method of providing a storage battery comprising: providing a plurality of cells, each of the cells comprising a housing and more than one terminal extending from an end thereof; providing a plurality of control units, each of the control units comprising a housing and electronic circuitry provided therein, wherein each of the control units comprise more than one terminal extending from an end of the housing and electrically connected to the electronic circuitry, the housing of each control unit being a separate structure from the housing of each other control unit and from the housing of each cell; and installing each control unit in the storage battery independent of each other control unit and each cell, and arranging the plurality of cells and the plurality of control units side-by-side in an alternating fashion such that a control unit is provided in between a first one of the plurality of cells and a second one of the plurality of cells.

23. The method of claim 22, wherein the housing of each of the control units is substantially similar in size, shape, and volume to the housing of each of the cells.

24. The method of claim 22, further comprising electrically connecting a first terminal of one of the plurality of control units to a positive terminal of the first one of the plurality of cells and a second terminal of the control unit to a negative terminal of the second one of the plurality of cells.

25. The method of claim 22, further comprising electrically connecting each of the plurality of control units to a central control unit.

* * * * *